United States Patent [19]

Jaisinghani

[11] 4,315,822

[45] Feb. 16, 1982

[54] PROCESS AND APPARATUS FOR SEPARATING LIQUIDS

[75] Inventor: Rajan A. Jaisinghani, Stoughton, Wis.

[73] Assignee: Nelson Industries, Inc., Stoughton, Wis.

[21] Appl. No.: 228,248

[22] Filed: Jan. 26, 1981

[51] Int. Cl.³ .............................................. B01D 17/04
[52] U.S. Cl. .................... 210/794; 210/802; 210/804; 210/805; 210/96.1; 210/104; 210/115; 210/258; 210/259; 210/DIG. 5
[58] Field of Search ............... 210/793, 794, 795, 799, 210/802, 804, 805, 806, 96.1, 103, 104, 109, 112, 115, 195.1, 257.1, 258, 259, 275, 521, 522, DIG. 5

[56] References Cited

U.S. PATENT DOCUMENTS

| 3,253,711 | 5/1966 | Young | 210/258 |
|---|---|---|---|
| 3,965,004 | 6/1976 | Garber | 210/799 |
| 4,113,617 | 9/1978 | Bereskin | 210/DIG. 5 |
| 4,139,463 | 2/1979 | Murphy | 210/258 |

FOREIGN PATENT DOCUMENTS 2800061 7/1978 Fed. Rep. of Germany ... 210/DIG. 5

*Primary Examiner*—Ernest G. Therkorn
*Attorney, Agent, or Firm*—Andrus, Sceales, Starke & Sawall

[57] ABSTRACT

A process and apparatus for separating liquids of different specific gravities, and more particularly for separating oil from water. The oil-contaminated water is pumped by a low emulsifying pump from a storage site to an oil gravity separator where a substantial portion of the oil is separated by gravity from the water. The water is then delivered from the gravity separator to a regenerative filter composed of a plurality of layers of granular media which serve to remove foreign materials and the remaining oil from the water. The clarified water can then be discharged to a discharge site. The oil-separator vessel includes an upper oil collection zone, and a capacitance-type sensor is responsive to the level of oil in the collection zone and operates, when the oil reaches a pre-set maximum level, to close a valve to prevent water flow to the regenerative filter, while opening a drain valve to permit the oil to be discharged from the separator vessel by the pump to an oil recovery tank. With the invention, a single pump is utilized to alternately pump the clarified water to the water discharge site, and to pump the collected oil sludge to the oil recovery tank without undue emulsification of the incoming oil-contaminated water.

21 Claims, 1 Drawing Figure

PROCESS AND APPARATUS FOR SEPARATING LIQUIDS

BACKGROUND OF THE INVENTION

Ship bilge water normally contains substantial quantities of fuel oil and other hydrocarbons, as well as a substantial quantity of suspended solids. In the past, bilge water was merely pumped overboard, but due to recent environmental controls, it is required that oil sludge be separated from the bilge water before the water is discharged.

Various types of oil separating units have been used in the past to separate oil from bilge water. In most systems the separating unit is located on the suction side of the pump in order to minimize agitation of the bilge water and prevent emulsification of the oil. However, suction side systems cannot draw water to any substantial height and thus systems of this type are normally restricted to locations less than approximately 20 feet above the bilge sump.

Other oil separation systems, as used in the past, have located the separating unit on the discharge side of the pump and have pumped the bilge water to a gravity separator that operates under atmospheric pressure. In systems of this type, the separated oil has been discharged from the separator by gravity, and a second pump is frequently used to flow the water effluent from the gravity separator through a final separating stage. Attempts to utilize a single pump to discharge the heavy viscous oil from the separating unit located on the discharge side of the pump, have not been successful in that high pump pressures are required, and the high pressure tends to emulsify the oil and water during normal operation of the system. Thus, there has been a need for a system which employs a single pump operating at low pressure and which is still capable of pumping the heavy oil during the drain cycle.

SUMMARY OF THE INVENTION

The invention is directed to an improved process and apparatus for separating liquids of different specific gravities and more specifically for separating oil from water. The invention has particular application for separating oil from bilge water. The system of the invention features a low emulsifying type pump that normally operates at a low pressure when water is being pumped through the separating unit to minimize emulsification. During periods when the heavy viscous oil is to be drained from the separating unit, the water flow line is closed, causing an increase in pressure in the separating unit and the resultant high pressure forces the heavy oil from the separator unit through the then open oil drain line.

In accordance with the invention, the oil contaminated water is pumped by low emulsifying pump from the bilge or other sump to an oil gravity separator. As the combination of oil, solids and water, flows into the separator, the large oil droplets rise to the top of the vessel and the larger solid particles settle to the bottom. After this initial separation, the water flows through a plurality of inclined parallel plates in the separator vessel, and the shorter rise distance provided by the plates allows the oil droplets to separate from the water and collect on the surfaces of the plates. The angle of the parallel plates and the flow of the water permits the oil droplets to rise and be collected at the top of the separator vessel.

The water, after gravity separation of the oil, is pumped to a regenerative filter, which is composed of a plurality of superimposed layers of granular media. The flow of water is downward through the filter media, which has a high solids and oil removal efficiency. After removal of the solids and oil in the regenerative filter, the water flows through an oil content monitor and then is pumped overboard. If the oil level in the clarified water exceeds a given value, such as 15 ppm, the monitor activates a valve to recycle the water back to the system inlet.

A capacitance-type sensor is located in the oil collection zone in the upper end of the oil gravity separator, and when a predetermined maximum quantity of oil has been collected, the sensor opens a drain line to an oil recovery tank, while closing the water flow line through the regenerative filter. By closing the water line and opening the oil drain line, the pump, acting against the heavy viscous oil, will develop an increased pressure in the separating unit to thereby deliver the collected oil sludge from the separator tank to the oil recovery tank. When the oil volume in the separator vessel has been reduced to a minimum preset level, the oil drain valve is closed and the water line valve is re-opened to restore normal operation. This method of operation solves the basic problem and enables a single pump, normally operating at low pressure to minimize emulsification, to be used to discharge the heavy oil from the separator unit.

In the operation of the system, the regenerative filter restriction will increase due to the capture of oil, semi-solids, and solids. A provision is made to automatically backwash the filter when the pressure drop across the filter exceeds a value, such as 5 psi. Both water and air are used alternately to backwash the filter, and the water can be supplied from a pressurized system or from a storage tank and utilizing a second pump.

The oil separating system of the invention incorporates only a single pump, and the gravity separator and regenerative filter are located on the discharge side of the pump. The pump develops a sufficient pressure head to pump the clarified water through the gravity separator and filter to a collection site and to pump the viscous oil sludge from the gravity separator to the oil recovery tank without any appreciable emulsification of the oil.

The system of the invention is self-cleaning and requires no routine maintenance. As a further advantage, the filter does not use replaceable cartridges. These features help to provide a low operating cost for the system.

As all of the components of the system are on the discharge side of the self-priming pump, the system is not susceptible to priming problems due to air leaks on the suction side.

The invention is designed to be automatically programmed, thereby reducing labor costs.

Other objects and advantages will appear in the course of the following description,

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
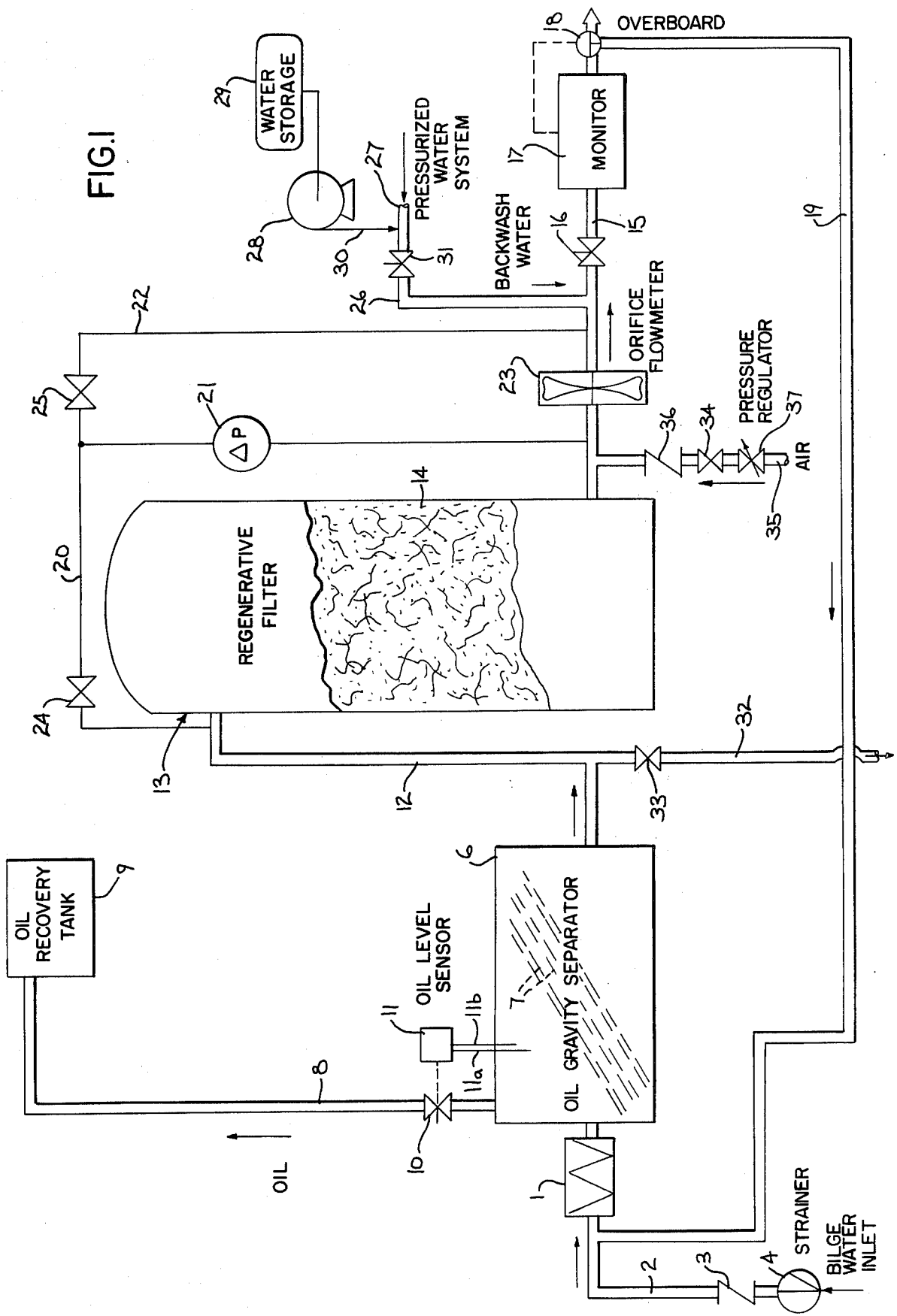
FIG. 1 is a diagrammatic flow sheet showing the system of the invention.

The drawing shows the oil-water separating system of the invention, as used to separate oil from bilge water in a ship. A pump 1 is adapted to draw the oil-contaminated bilge water through line 2 from the bilge, not shown, and a check valve 3 and strainer 4 are located in line 2.

The pump 1 is a conventional low-emulsifying pump such as an auger-type, low velocity, progressive cavity pump, which minimizes agitation and prevents emulsification of the oil in the bilge water. The pump has a rated capacity of about 75 psi and normally operates at 10 to 65 psi.

The oil-contaminated water is discharged from pump 1 through line 5 to an oil gravity separator, designated generally by 6. The particular design of the oil-gravity separator is not a part of the present invention. As the oil-contaminated water flows into the separator, the larger oil droplets rise to the top of the separator vessel and the larger solid particles settle to the bottom. After this initial separation phase, the water flows through a set of inclined parallel plates 7, and the shorter rise distance provided by the pairs of plates allows the smaller oil droplets to separate from the water and collect on the surface of the plates in the form of an oil film. The angle of the plates 7 and the flow of water through the separator 6 allows the oil film to flow upwardly along the parallel plates for collection at the top of the vessel.

The accumulated oil is periodically discharged from the separator tank 6 through a line 8 which is connected to an oil recovery tank 9. Valve 10 is connected in line 8.

A capacitance-type oil level sensor, indicated by 11, is mounted in the upper portion of the separator vessel 6 and includes a pair of liquid level probes 11a and 11b that extend downwardly into the oil collection zone. When the oil has collected to a predetermined depth in the separator vessel 6, the sensor 11a will operate to open the drain valve 10, while closing the water flow line downstream of the separator 6, as will be hereinafter described, so that the pump 1 will then operate to pump the oil from the upper portion of the separator tank to the oil recovery tank 9. When the oil volume in the separator tank 6 has been reduced to a second minimum pre-set level, the sensor 11b will operate to close the drain valve 10 and open the water line valve downstream of the separator 6 to return the system to normal operation.

The oil sensing system can also operate with a single probe and a timer. In this case, when the oil has collected to a preset depth, the sensing probe will operate to open the oil drain valve 10 and close the valve in the water flow line and the valves will remain in this condition for a given time period, sufficient to drain the major portion of the collected oil.

After removal of oil in separator tank 6, the water is pumped through line 12 to the upper end of a regenerative filter unit 13. The filter unit contains a bed of superimposed layers of particulate or granular material 14. The particular construction of the filter bed does not form a part of the present invention. As the water flows downwardly through the filter media, solids and remaining oil are removed and the clarified bilge water is discharged overboard through line 15, or alternately can be discharged through line 15 to a collection tank.

Flow within line 15 is controlled by valve 16 and an oil monitor 17 is located in line 15, downstream of valve 16. The monitor 17 senses the presence of oil in the water flowing in line 15, and if the oil level in the effluent water exceeds a value, such as 15 ppm, the monitor sounds an alarm and activates a three-way valve 18 to recirculate the effluent through line 19 to the inlet of the system. Recycling of the effluent will act to reduce the oil content in the water to the required level. When the desired minimum oil level is reached, as determined by the monitor 17, the monitor will operate to actuate the valve 18 to direct the water flow in line 15 overboard, or to a water collection site.

In the operation of this system, the regenerative filter restriction will increase due to the capture of oil, semisolids and solids. The change in water flow rate, due to this increase in restriction, will be negligible due to the characteristics of the low emulsifying pump. However, when the restriction of the filter unit 13 has increased to a preset value, a backwash cycle is initiated to backwash the filter bed. To measure the pressure drop across the filter unit 13, a pressure tap line 20 is connected between line 12 on the upstream side of the filter 13 and line 15 on the downstream side of the filter. A differential pressure gauge 21 is located in line 20 and measures the pressure differential across the filter.

A second pressure line 22 is connected between the line 20 and the water line 15 downstream of an orifice 23 located in the water line. Petcocks or valves 24 and 25 are located in lines 20 and 22, respectively.

During normal operation of the system, the valve 24 will be open and valve 25 will be closed and the gauge 21 will read the pressure differential across the filter bed 14. When the pressure differential reaches a preset value, such as 5 psi, the backwash cycle is initiated either manually or automatically.

To backwash the filter unit 13, a backwash water line 26 is connected to line 15 downstream of the orifice 23, and water is supplied to the line 26 either from a pressurized water line 27 available in the ship or other installation, or alternately, by a pump 28 which pumps water from a storage tank 29 through line 30 to the line 26. Valve 31 is located in line 26.

To backwash the filter, the valve 31 is opened and valve 16 is closed, causing the backwash water to enter the filter unit 13 at the bottom and flow upwardly through the granular media 14 to backwash the same. The backwash water is discharged from the filter unit 13 through line 12 then through line 32 to a backwash water outlet, not shown. Valve 33 is positioned in line 32 and is open during the backwash cycle and closed during normal operation. Flow through gravity separator 6 is prevented by the pump and check valve 3.

To provide the proper flow rate during the backwash cycle, the valve 24 in pressure line 20 is closed, and the valve 25 in pressure line 22 is open, so that the pressure gauge 21 will read the pressure across the orifice 23. Through adjustment of valve 31 the proper backwash flow rate can then be obtained, as recorded by the pressure gauge 21. When the proper flow rate has been established, the pressure differential system can be returned to its original condition, by opening valve 24 in line 20 and closing valve 25 in line 22. The proper flow rate is normally set only at initial start-up.

In backwashing the filter media 14, it is preferred to alternately use water and air as the backwashing medium. After a predetermined period for the water backwash, the valve 31 is closed, and the valve 34 in air line 35 is opened. Air line 35 is connected to a suitable source of air under pressure, generally at a value in the range of 50 to 125 psi, and a check valve 36 and a conventional air pressure regulator 37 are connected in the air line on opposite sides of valve 34. During the air backwash, air is introduced into the lower end of the filter unit 13 and passes upwardly through the filter media 14 and is discharged through line 32 to the backwash outlet.

After backwashing, the normal mode of operation will be resumed by closing the air inlet valve 34 and backwash valve 31 in line 26 and valve 33 in backwash line 32 and opening valve 16 in water line 15.

OPERATION OF THE SYSTEM

In normal operation, the pump 1 is operated to draw bilge water from the bilge or other water storage tank, and the oil-contaminated water is discharged by the pump into the gravity separator 6 where the oil is separated from the water and collects as a layer in the upper portion of the separation vessel. When the depth of the oil in vessel 6 reaches a predetermined value, as detected by the sensor 11, the sensor will open the oil drain valve 10 and close the water line valve 16, so that continued operation of the pump 1 will pump the oil from the oil collection zone of vessel 6 through line 8 to the oil recovery tank 9.

When the oil level in the separator vessel 6 has increased to a pre-set minimum, the sensor 11 will operate to close the drain valve 10 in line 8 and reopen the water line valve 16 so that the water will be pumped through the system for discharge overboard or to a suitable collection tank.

When the pressure differential gauge 21 indicates that the pressure differential across the filter bed 15 has increased to a value of about 5 psi, the backwash cycle is initiated either manually or through automatic controls. To begin the backwash cycle, the valve 31 in the backwash line 26 is opened, valve 16 in line 15 is closed, and the valve 33 in the backwash outlet line 32 is opened. With this arrangement, water either from pressure line 27 or pumped from the storage tank 29, is delivered to the filter unit 13 and passes upwardly through the filter media 14 to backwash the same. The water being discharged from the filter 13 through line 32 can be delivered to a suitable storage tank or can be returned to the bilge.

To set the proper backwash flow rate at start-up of the system, the valve 24 in pressure line 20 is closed and the valve 25 in pressure line 22 is opened and the pressure reading across the orifice 23 will then be measured by pressure gauge 21. By adjusting the valve 31, the desired backwash flow rate can be obtained.

After a predetermined cycle of water backwash, the valve 31 is closed and the valve 34 in air line 35 is opened to admit air to the tank to provide a second backwashing cycle.

After a preset time interval, the air valve 34 is closed, the water backwash valve 31 in line 26 is opened and a second water backwash cycle can be carried out.

After the backwash cycle is completed, the valves 31, 33 and 34 are closed and valve 16 in water line 15 is opened and the pump 1 is started in order to flow water through the system in the normal manner. At this time, the pressure line valve 24 in line 20 is opened and valve 25 in line 22 is closed, so that the differential pressure gauge 26 will then read the pressure across the filter bed 14.

The capacitance-type sensor 11 is responsive to the dielectric constant of the fluid within the upper portion of the separator vessel 6. The low dielectric constant of either oil or air will trigger the sensor to open the valve 10 to discharge fluid from the collection zone in the upper end of the separator vessel. At the start-up of the system, the sensor will thus operate to open the valve 10 to discharge air from the vessel until the water level rises to the level of the sensor.

The pressure head developed by the single pump 1 operates to discharge the water through the system, as well as discharging the heavy oil from the separator tank 6 to the oil recovery tank 9, and the pumping is accomplished with minimum agitation to prevent emulsification of the oil in the water.

As the gravity separator 6 and the filter unit 13 are on the discharge side of the pump 1, the system has greater versatility in location than a system in which the oil separating units are positioned on the suction side of the pump. For example, with the invention, the pump and oil separating units can be located below deck in an area near the bilge, or alternately, can be located above deck or at any other convenient location in the ship.

The unit is compact and can be built in modules to facilitate installation.

In addition, the system is self-cleaning and requires no routine maintenance which substantially reduces the operating cost of the unit.

While the above description has shown the separation of a lighter weight liquid, such as oil, from a heavier weight liquid, such as water, it is contemplated that the system can be used to separate a heavy liquid from the flow stream of a light liquid by positioning the drain line 8 in the lower end of the separating tank. In addition, the system can be used in connection with mixtures of three liquids having different specific gravities, with the light and heavy liquids being drained from the upper and lower ends of the separator tank, respectively, and the liquid of intermediate specific gravity passing through the system.

Various modes of carrying out the invention are contemplated as being within the scope of the following claims particularly pointing out and distinctly claiming the subject matter which is regarded as the invention.

I claim:

1. A system for separating a mixture of liquids of different specific gravities, comprising pumping means having an inlet and an outlet, said inlet connected to storage site containing a mixture of liquids of different specific gravities, a first gravity separator unit connected to the outlet of the pumping means whereby the mixture of liquids is pumped from said site to the first separator unit, said first separator unit disposed to separate the liquids with a first liquid of said mixture being collected as a layer in said separator unit and a second of said mixture of liquids normally flowing through said separator unit, liquid discharge conduit means connecting said separator unit with a collection site for conducting said second liquid to said site, first valve means disposed in said discharge conduit means, said first valve means being normally open to permit flow of said second liquid through said separator unit and through said discharge conduit means, drain conduit means connected to the portion of said separator whereat said first liquid is collected, second valve means disposed in said drain conduit means, and means responsive to a predetermined maximum depth of said layer of first liquid in said first separator unit for opening said second valve means and closing said first valve means, whereby operation of said pumping means will pump said layer of said first liquid through said drain conduit means to a second collection site.

2. The system of claim 1, and including means for closing said second valve means and simultaneously opening said first valve means after a quantity of the collected layer of said first liquid has been pumped from the separator unit.

3. The system of claim 1, and including a second separator unit disposed in said discharge conduit means and located between said first separator unit and said collection site, said second separator unit serving to remove any remaining first liquid from said second liquid.

4. The system of claim 3, wherein said second separator unit includes a bed of superimposed layers of granular material.

5. The system of claim 1, wherein said first separator unit includes a plurality of inclined parallel separating plates.

6. The system of claim 1, and including sensing means disposed in said discharge conduit means for sensing the presence of said first liquid in the flow stream of said second liquid, recirculating conduit means connecting the discharge conduit means with the inlet of said pumping means, and flow control means for directing the flow of said second liquid through said recirculating conduit means to said pumping means when the amount of said first liquid in the flow stream of said second liquid exceeds a predetermined value.

7. The system of claim 1, wherein the first liquid is more viscous than the second liquid, whereby closing of said first valve means will result in an increase in pressure in the separator unit sufficient to discharge the collected layer of said first liquid through said drain conduit means.

8. A system for separating oil from water, comprising a pump having an inlet and an outlet, said inlet being connected to a storage site containing oil-contaminated water, a gravity separator unit connected to the outlet of the pump whereby said oil-contaminated water is delivered by said pump to said separator unit, said oil being collected as a layer in the upper portion of said separator unit, a discharge conduit connecting the lower portion of the separator unit with a collection site for conducting clarified water from the separator unit to said site, first valve means disposed in said discharge conduit, a drain conduit connected to the upper end of said separator unit, second valve means disposed in said drain conduit, and means for opening the second valve means and closing said first valve means when the collected oil layer reaches a predetermined depth, whereby operation of said pump will pump said collected layer of oil through said drain conduit to an oil recovery site.

9. The system of claim 8, and including a filter unit disposed in said discharge conduit downstream of said separator unit.

10. The system of claim 9, and including backwash means for flowing a fluid upstream through said filter unit.

11. The system of claim 10, wherein said backwash means comprises means for flowing backwash water through said filter unit and for alternately flowing air through said filter unit.

12. The system of claim 9, and including means for measuring the pressure differential across the filter unit, said backwash means being operable when the pressure different exceeds a predetermined pressure differential.

13. The system of claim 10, and including means for measuring the flow rate of said backwash fluid through the filter unit, and adjusting means for adjusting the flow rate of said backwash fluid through said filter unit.

14. The system of claim 8, and including means for closing said second valve means and opening said first valve means after a quantity of the collected layer of oil has been pumped from the separator unit.

15. A method of separating immiscible liquids of different specific gravities from a mixture of said liquids, comprising the steps of operating a pump to flow the mixture of liquids sequentially through the pump and a gravity separating unit, collecting a first liquid of said mixture as a collected layer in said separator unit, a second liquid of said mixture flowing from the separator unit through a discharge line, closing the discharge line when the layer of said first liquid has collected to a given depth and opening a drain line that communicates with the portion of the separator unit containing said collected layer while operating the pump to pump said collected layer from the separator unit through the drain line by the continued operation of pumping said mixture into said separating unit, and opening the discharge line and closing the drain line, whereby the continued operation of the pump will re-establish flow of said second liquid through the discharge line.

16. A method of separating oil from water, comprising the steps of operating a pump to flow oil-contaminated water sequentially through the pump and a separator unit and then through a discharge line to a collection site, separating oil by gravity from the water in the separator unit and collecting the separated oil as a layer in the upper portion of said separator unit, connecting a drain line to the upper portion of said separator unit, closing said discharge line and opening said drain line when the depth of separated oil in the separator unit has increased to a preset maximum whereby continued operation of the pump will drive the oil from the separator unit through said drain line to an oil recovery site, and closing said drain line and opening said discharge line when the depth of separate oil recedes, whereby continued operation of the pump will re-establish the flow of water from the separator unit through the discharge line to the collection site.

17. The method of claim 16, and including the step of maintaining the pressure of the oil-contaminated water in the separator unit at a value in the range of 10 to 65 psi.

18. The method of claim 16, and including the step of sensing the amount of oil in the water passing through said discharge line, and recirculating the water from the discharge line to the separator unit when the amount of oil in the water passing through the discharge line exceeds a preset value.

19. The method of claim 16, and including the step of passing the water being discharged from the separator through a granular filter bed.

20. The method of claim 19, and including the steps of measuring the pressure drop across the filter bed, closing the discharge line when the pressure drop reaches a predetermined maximum value, and flowing a backwashing fluid through the filter bed in the opposite direction from the flow of water through said bed to thereby remove oil and contaminants from said bed.

21. The method of claim 20, wherein said step of flowing a backwashing fluid comprises flowing water and air sequentially through said bed.

* * * * *